United States Patent
Ma et al.

(10) Patent No.: US 10,102,373 B2
(45) Date of Patent: Oct. 16, 2018

(54) METHOD AND APPARATUS FOR CAPTURING OPERATION IN A CONTAINER-BASED VIRTUALIZATION SYSTEM

(71) Applicant: BEIJING BAIDU NETCOM SCIENCE AND TECHNOLOGY CO., LTD., Beijing (CN)

(72) Inventors: Liang Ma, Beijing (CN); Ning Qu, Beijing (CN); Baisheng Wang, Beijing (CN); Zhipeng Wang, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 241 days.

(21) Appl. No.: 15/237,940

(22) Filed: Aug. 16, 2016

(65) Prior Publication Data

US 2017/0103206 A1  Apr. 13, 2017

(30) Foreign Application Priority Data

Oct. 13, 2015 (CN) .......................... 2015 1 0670474

(51) Int. Cl.
*G06F 21/56* (2013.01)
*G06F 9/48* (2006.01)
(Continued)

(52) U.S. Cl.
CPC ............ *G06F 21/566* (2013.01); *G06F 9/445* (2013.01); *G06F 9/44505* (2013.01); *G06F 9/455* (2013.01); *G06F 9/48* (2013.01)

(58) Field of Classification Search
CPC ........ G06F 21/50; G06F 21/55; G06F 21/554; G06F 21/56; G06F 21/566; G06F 9/445; G06F 9/44505; G06F 9/455; G06F 9/48
See application file for complete search history.

(56) References Cited

U.S. PATENT DOCUMENTS

| | | | |
|---|---|---|---|
| 8,271,996 B1 * | 9/2012 | Gould | G06F 9/542 719/312 |
| 8,627,414 B1 * | 1/2014 | McCune | H04L 9/3234 709/212 |

(Continued)

*Primary Examiner* — Khang Do
(74) *Attorney, Agent, or Firm* — Seed IP Law Group LLP (57) ABSTRACT

The present application discloses a method and apparatus for capturing an operation, and security control in a container-based virtualization system. A specific implementation of the method for capturing the operation includes: detecting, in a user mode, a process launch operation in a container of the container-based virtualization system; and performing, in a kernel mode, a step of capturing a signal processing operation, if the process launch operation is detected, the step of capturing the signal processing operation comprising: determining a presence of an unprocessed signal in the process; causing an executable instruction indicated by the unprocessed signal to jump to an entry address of a self-defined first function, and passing a signal number of the unprocessed signal to the first function, if the unprocessed signal exists; and capturing a signal processing operation corresponding to the passed signal number, if the first function is called. This implementation implements the capture of an access operation by a process in a container to a host kernel, so that security control can be subsequently performed on the captured operation to ensure the security of the system.

16 Claims, 4 Drawing Sheets

(51) Int. Cl.
*G06F 9/445* (2018.01)
*G06F 9/455* (2018.01)

(56) References Cited

U.S. PATENT DOCUMENTS

| | | | |
|---|---|---|---|
| 8,732,824 B2* | 5/2014 | Arbaugh | G06F 21/57 726/22 |
| 2005/0060722 A1* | 3/2005 | Rochette | G06F 8/60 719/319 |
| 2009/0288161 A1 | 11/2009 | Wei et al. | |
| 2010/0031360 A1* | 2/2010 | Seshadri | G06F 21/57 726/24 |
| 2010/0251031 A1* | 9/2010 | Nieh | G06F 11/3419 714/45 |
| 2011/0247005 A1 | 10/2011 | Benedetti et al. | |
| 2014/0095821 A1* | 4/2014 | Yang | G06F 17/30091 711/162 |
| 2016/0371322 A1* | 12/2016 | Gunti | G06F 17/30377 |

\* cited by examiner

FIG. 6

METHOD AND APPARATUS FOR CAPTURING OPERATION IN A CONTAINER-BASED VIRTUALIZATION SYSTEM

CROSS-REFERENCE TO RELATED APPLICATION

This application is related to and claims priority from Chinese Application Ser. No. 201510670474.1, filed on Oct. 13, 2015, entitled "METHOD AND APPARATUS FOR CAPTURING OPERATION IN A CONTAINER-BASED VIRTUALIZATION SYSTEM" by Beijing Baidu Netcom Science And Technology Co., Ltd., the entire disclosure of which is hereby incorporated by reference.

BACKGROUND

Technical Field

The present application relates to the technical field of computers, specifically to the technical field of computer security, and more specifically to a method and apparatus for capturing an operation, and security control in a container-based virtualization system.

Description of the Related Art

Virtualization refers to virtualizing multiple logical computers (virtual machines) on a single computer (physical machine) by using virtualization technology. Multiple logical computers run on the same computer at the same time. Each logical computer is capable to run a different operating system. Applications can run in independent spaces without affecting one another, thereby significantly improving the working efficiency of the computer. At present, container-based virtualization technologies are one of the most widely utilized virtualization technologies, which can provide lightweight virtualization to compartmentalize processes and resources, and do not require the provision of an instruction interpreting mechanism and other complex processing of full virtualization. A container-based virtualization system is a virtual environment built by using container-based virtualization technology and includes containers and a host. With the use of containers, resources managed by a single operating system are effectively grouped into an isolated group, in order to better balance conflicting resource usage demands among the isolated groups. Compared with conventional virtualization technologies, container-based virtualization technologies are advantageous in that the performance loss is minimal because all containers share the same kernel of the host, and instruction-level simulation is not required.

However, in the container-based virtualization system, because a container can directly access the kernel of the host, a process in the container can easily invade the host kernel and take control over the host, threatening the security of the entire host and other containers. To ensure the security of the container-based virtualization system, an access operation of a process in a container to the host kernel needs to be captured, and appropriate processing needs to be performed on the captured operation. However, currently there is no method capable of implementing the capture of an access operation by a process in a container to a host kernel.

BRIEF SUMMARY

An objective of the present application is to provide a method for capturing an operation and security control method and apparatus in a container-based virtualization system, so as to solve the technical problem mentioned in the Background section.

According to a first aspect, the present application provides a method for capturing an operation in a container-based virtualization system, which includes: detecting, in a user mode, an process launch operation in a container of the container-based virtualization system; and performing, in a kernel mode, a step of capturing a signal processing operation, if the process launch operation is detected, the step of capturing the signal processing operation comprising: determining a presence of an unprocessed signal in the process; causing an executable instruction indicated by the unprocessed signal to jump to an entry address of a self-defined first function, and passing a signal number of the unprocessed signal to the first function, if the unprocessed signal exists; and capturing a signal processing operation corresponding to the passed signal number, if the first function is called.

According to a second aspect, the present application provides a security control method for a container-based virtualization system, which comprising: capturing a kernel access operation of a process in a container of the container-based virtualization system by using the method according to the first aspect, the kernel access operation being a signal processing operation or a system call operation; acquiring a signal number corresponding to the signal processing operation, if the captured kernel access operation is the signal processing operation; and switching an executable instruction indicated by a signal corresponding to the signal number to a privilege level Ring3 of a central processing unit for execution.

According to a third aspect, the present application provides an apparatus for capturing an operation in a container-based virtualization system, which comprises: a process launch detecting unit for detecting, in a user mode, an process launch operation in a container of the container-based virtualization system; and a signal processing capturing unit for performing, in a kernel mode, a step of capturing a signal processing operation, if the process launch detecting unit detects the process launch operation, the signal processing capturing unit comprising: a signal detecting subunit for determining a presence of an unprocessed signal in the process; an executable instruction jumping subunit for causing an executable instruction indicated by the unprocessed signal to jump to an entry address of a self-defined first function, and passing a signal number of the unprocessed signal to the first function, if the unprocessed signal exists; and a signal processing capturing subunit for capturing a signal processing operation corresponding to the passed signal number, if the first function is called.

According to a fourth aspect, the present application provides a security control apparatus for a container-based virtualization system, which comprises: an operation capturing unit for capturing a kernel access operation of a process in a container of the container-based virtualization system by using the method according to the first aspect, the kernel access operation being a signal processing operation or a system call operation; a signal number acquiring unit for acquiring a signal number corresponding to the signal processing operation, if the captured kernel access operation is the signal processing operation; and a privilege level switching unit for switching an executable instruction indicated by a signal corresponding to the signal number to a privilege level Ring3 of a central processing unit for execution.

According to the method and apparatus for capturing the operation and security control in the container-based virtualization system that are provided by the present application, an executable instruction indicated by an unprocessed signal in a process is caused to jump to an entry address of a self-defined first function, so that a signal processing operation that may access a kernel is captured, thereby implementing the capture of an access operation of a process in a container to a host kernel. Subsequently, security control can be performed on the captured operation to ensure the security of the system.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION

The present application will be described in details below in conjunction with the accompanying drawings and embodiments. It should be appreciated that the embodiments described herein are merely provided to illustrate the present invention, but not to limit the present invention. In addition, it should also be noted that only the related parts of the present invention are shown in the accompanying drawings for the ease of description.

It should be noted that the embodiments and features of the embodiments in the present application, on a non-conflicting basis, may be combined. The present application will be discussed in details below with reference to the accompanying drawings.

Figure 1:
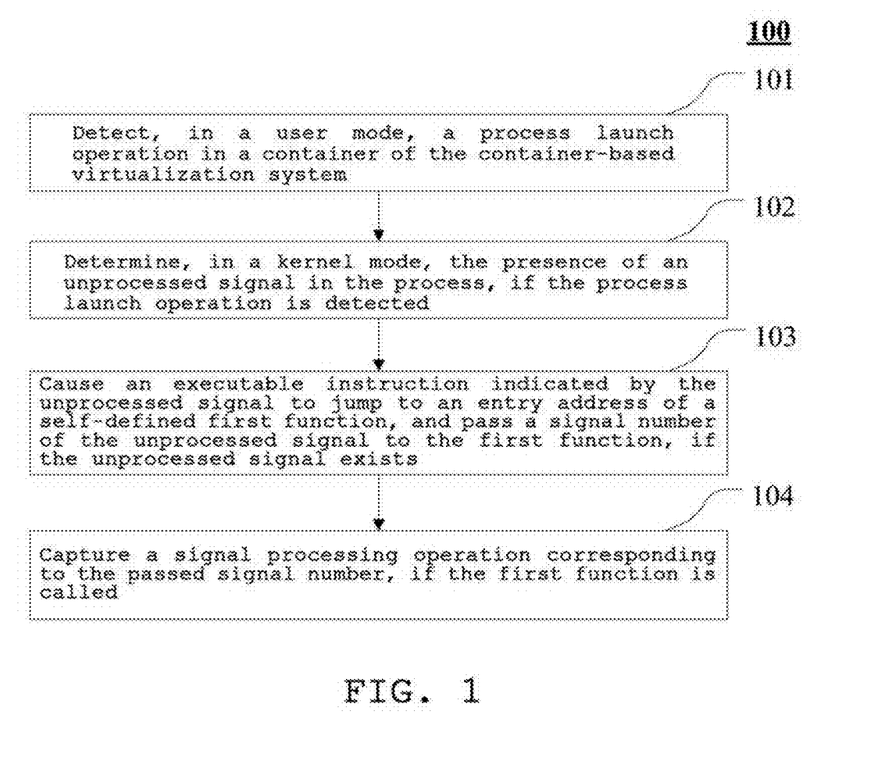
FIG. 1 is a flowchart of a method for capturing an operation in a container-based virtualization system according to an embodiment of the present application.

FIG. 1 shows a flow 100 of a method for capturing an operation in a container-based virtualization system according to an embodiment of the present application.

As shown in FIG. 1, the method for capturing the operation in the container-based virtualization system of this embodiment comprises the following steps:

Step 101: Detect, in user mode, a process launch operation in a container of the container-based virtualization system.

In this embodiment, step 101 may include: detecting an operation corresponding to executing the above-mentioned process by a central processing unit (CPU) of a host of the virtualization system. According to the CPU virtualization technology, when a process is running, the process occupies a virtual CPU in a kernel first. Therefore, in this step, detecting processing may be added to the processing for the virtual CPU, in order to implement the detecting of the above-mentioned process launch operation.

Step 102: If the above-mentioned process launch operation has been detected, determine, in kernel mode, the presence of an unprocessed signal in the above-mentioned process.

In this embodiment, after the above-mentioned process launch operation is detected, a task_struct structure (which is a process descriptor for Linux operating system) of the above-mentioned process may be obtained in kernel mode. The presence of an unprocessed signal in the process can be determined based on the task_struct structure.

Step 103: If the above-mentioned unprocessed signal exists, cause an executable instruction indicated by the above-mentioned signal to jump to an entry address of a self-defined first function, and pass a signal number of the above-mentioned signal to the above-mentioned first function.

In this embodiment, before step 102, the entry address of the above-mentioned first function may be passed to a kernel of a host in the above-mentioned virtualization system in user mode, and the entry address of the above-mentioned first function may be stored in a kernel space in kernel mode. Accordingly, causing the executable instruction indicated by the above-mentioned signal to jump to the entry address of the self-defined first function may include: acquiring the entry address of the above-mentioned first function stored in the above-mentioned kernel space; and causing the executable instruction indicated by the above-mentioned signal to jump to the entry address of the above-mentioned first function.

Step 104: Capture a signal processing operation corresponding to the passed signal number, if the above-mentioned first function is called.

Each signal corresponds to one positive constant integer, which is referred to as a signal number and is defined in a system header file. In this embodiment, because the executable instruction indicated by the above-mentioned signal is caused to jump to the entry address of the self-defined first function and the signal number of the above-mentioned signal is passed to the first function at step 103, the passed signal number may be obtained from the first function when the first function is called and executed, thereby capturing the signal processing operation corresponding to the signal number.

According to the method for capturing the operation in the container-based virtualization system provided in this embodiment, the executable instruction indicated by the unprocessed signal in the process to jump to the entry address of the self-defined first function, so that the signal processing operation that may access the kernel is captured, thereby implementing the capture of the access operation by the process in the container to the host kernel.

Figure 2:
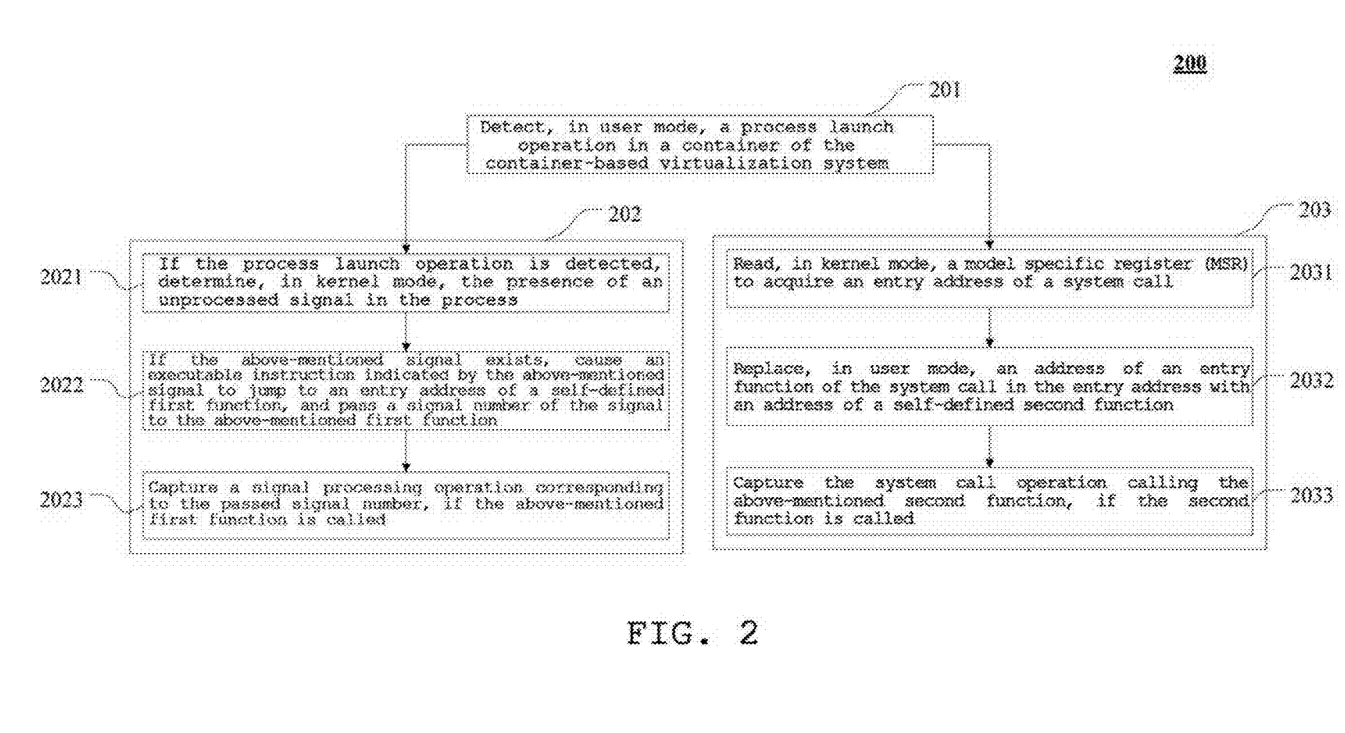
FIG. 2 is a flowchart of a method for capturing an operation in a container-based virtualization system according to another embodiment of the present application.

Further referring to FIG. 2, FIG. 2 shows a flow 200 of a method for capturing an operation in a container-based virtualization system according to another embodiment of the present application.

As shown in FIG. 2, the method for capturing the operation in the container-based virtualization system in this embodiment includes the following steps:

Step 201: Detect, in user mode, a process launch operation in a container of the container-based virtualization system.

In this embodiment, specific implementation of step 201 can be referred to the foregoing detailed description of step 101 in the embodiment corresponding to FIG. 1, and will not be repeatedly described here.

Step 202: If the above-mentioned process launch operation has been detected, perform, in kernel mode, a step of capturing a signal processing operation.

The above-mentioned step of capturing the signal processing operation includes:

Step 2021: Determine the presence of an unprocessed signal in the above-mentioned process.

Step 2022: If the above-mentioned signal exists, cause an executable instruction indicated by the above-mentioned signal to jump to an entry address of a self-defined first function, and pass a signal number of the above-mentioned signal to the above-mentioned first function.

Step 2023: Capture a signal processing operation corresponding to the passed signal number, if the above-mentioned first function is called. In this embodiment, specific implementations of steps 2021, 2022 and 2023 can be referred to the foregoing detailed descriptions of steps 102, 103 and 104 in the embodiment corresponding to FIG. 1, respectively, and will not be repeatedly described here.

Step 203: If the above-mentioned process launch operation has been detected, perform a step of capturing a system call operation.

The step of capturing the system call operation includes:

Step 2031: Read, in kernel mode, a model specific register (MSR) to acquire an entry address of a system call.

In this embodiment, if the process launch process has been detected in user mode, a self-defined command (for example, GET_SYSCALL) may be sent in user mode to a predetermined interface in kernel mode. After the above-mentioned interface in kernel mode receives the command, the model specific register may be read by using an MSR_L-STAR command, so as to acquire the entry address of the system call.

Step 2032: Replace, in user mode, an address of an entry function of the system call in the above-mentioned entry address with an address of a self-defined second function.

In the embodiment, this step may be performed in an address space of the above-mentioned process. Data stored in the entry address of the system call that is acquired in step 2021 is the address of the entry function of the system call. The original data in the above-mentioned entry address is modified to be the address of the self-defined second function, so that related entry parameter and system call number may be acquired from the second function when the above-mentioned process performs the system call operation.

Step 2033: Capture the system call operation calling the above-mentioned second function if the above-mentioned second function is called.

In this embodiment, the acquiring of the related entry parameter and system call number from the second function when the above-mentioned process performs the system call operation is implemented by means of step 2032. Therefore, the system call operation corresponding to the system call number may be captured if the second function is called and executed.

It should be noted that steps 202 and 203 may be performed concurrently, and the present embodiment has no limitation in the order in which they are performed.

As can be seen from FIG. 2, compared with the embodiment corresponding to FIG. 1, the step of capturing the system call operation is additionally provided in the flow 200 of the method for capturing the operation in this embodiment. Therefore, by means of the solution described in this embodiment, a kernel access operation of a process in a container may be more comprehensively captured, and subsequently appropriate security measures may be taken for the captured operation, thereby more comprehensively ensuring the security of the container-based virtualization system.

Figure 3:
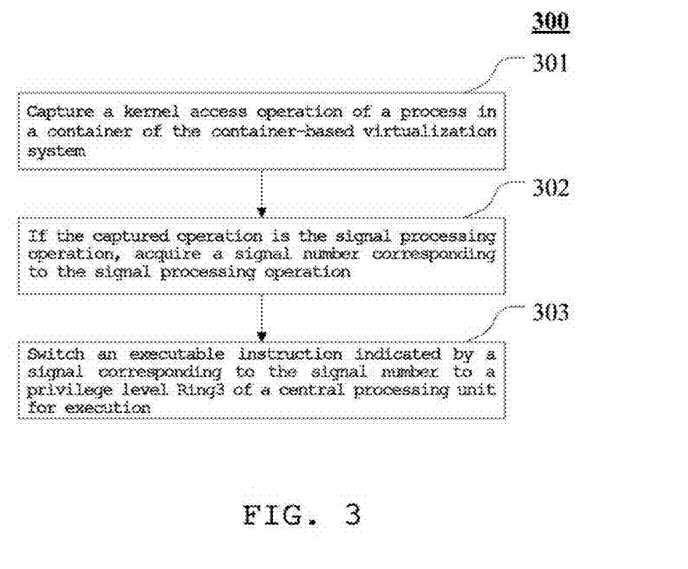
FIG. 3 is a flowchart of a security control method for a container-based virtualization system according to one embodiment of the present application.

Hereinafter, reference is made to FIG. 3. FIG. 3 shows a flow 300 of a method security control for a container-based virtualization system according to an embodiment of the present application.

As shown in FIG. 3, the security control method for the container-based virtualization system in this embodiment includes the following steps:

Step 301: Capture a kernel access operation of a process in a container of the container-based virtualization system by using the method for capturing the operation in the embodiments corresponding to FIG. 1 or FIG. 2, the above-mentioned kernel access operation being a signal processing operation or a system call operation.

In this embodiment, specific implementation of step 301 can be referred to the foregoing detailed description of the embodiments corresponding to FIG. 1 or FIG. 2, will not be repeatedly described here.

Step 302: If the captured operation is the signal processing operation, acquire a signal number corresponding to the signal processing operation.

In the embodiment, this step may be performed by the first function in the embodiments corresponding to FIG. 1 or FIG. 2. Because the signal number of the unprocessed signal is passed to the first function in step 301, the signal number corresponding to the signal processing operation may be obtained from the first function.

Step 303: Switch an executable instruction indicated by a signal corresponding to the above-mentioned signal number to a privilege level Ring3 of a central processing unit for execution.

The privilege level Ring3 of the central processing unit is currently a privilege level with the least privileges. Programs running in Ring3 may execute only relatively safe instructions, and may not execute relatively risky instructions of levels higher than Ring3 (for example, Ring0 instruction). Therefore, in the embodiment, the executable instruction indicated by the signal corresponding to the above-mentioned signal number is switched to the privilege level Ring3 of the central processing unit for execution, so that the executable instruction corresponding to the captured signal processing operation runs in security mode, thereby enhancing the security of the container-based virtualization system.

In some implementations of this embodiment, at step 301, the kernel access operation of the process in the container of the container-based virtualization system may be captured by using the method for capturing the operation in the embodiment corresponding to FIG. 2. The security control method of this embodiment may further include:

if the captured operation is the system call operation, determining whether the above-mentioned system call operation is safe based on a system call number and an entry parameter corresponding to the captured system call operation; and blocking the above-mentioned system call operation if the above-mentioned system call operation is determined to be unsafe.

Determining whether the above-mentioned system call operation is safe based on the system call number and the entry parameter corresponding to the captured system call operation may include: determining whether the above-mentioned system call operation is safe according to a preconfigured configuration file, the above-mentioned configuration file being used for specifying a system call number to be searched for and/or a resource to be protected, and an operation instruction associated with the above-mentioned system call number and/or the resource to be protected. For example, if no write operation is allowed to be performed on files under a path in order to protect these files, measures that need to be taken (for example, blocking the system call) when the system call number is the system call number corresponding to a write( ) system call and the entry parameter includes the path may be set in the configuration file.

The foregoing implementation additionally provides a security control method with respect to system call operations, so that the security control method of the present application may more comprehensively protect the container-based virtualization system.

According to the security control method for the container-based virtualization system provided in this embodiment, the executable instruction indicated by the signal corresponding to the captured signal processing operation is switched to the privilege level Ring3 of the central processing unit for execution, so that the above-mentioned executable instruction runs in security mode, thereby blocking the execution of risky instructions and enhancing the security of the container-based virtualization system.

Figure 4:
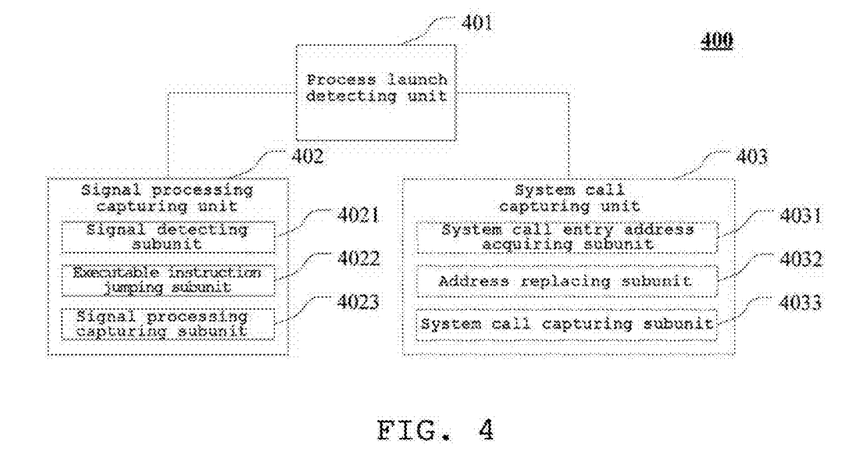
FIG. 4 is a schematic structural diagram of an apparatus for capturing an operation in a container-based virtualization system according to one embodiment of the present application.

Further reference is made to FIG. 4. As an implementation of the foregoing method shown in FIG. 1, the present application provides an embodiment for an apparatus for capturing an operation in a container-based virtualization system. This apparatus embodiment corresponds to the method embodiment as shown in FIG. 1. The apparatus may be specifically applied to a container-based virtualization system.

As shown in FIG. 4, the apparatus 400 for capturing the operation in this embodiment includes a process launch detecting unit 401 and a signal processing capturing unit 402. The process launch detecting unit 401 is used to detect, in user mode, a process launch operation in a container of the container-based virtualization system. The signal processing capturing unit 402 is used to perform, in kernel mode, a step of capturing a signal processing operation, if the process launch detecting unit detects the above-mentioned process launch operation. The signal processing capturing unit 402 includes: a signal detecting subunit 4021 for determining the presence of an unprocessed signal in the above-mentioned process; an executable instruction jumping subunit 4022 for causing an executable instruction indicated by the above-mentioned signal to jump to an entry address of a self-defined first function, and passing a signal number of the above-mentioned signal to the above-mentioned first function, if the above-mentioned signal exists; and a signal processing capturing subunit 4023 for capturing a signal processing operation corresponding to the passed signal number, if the above-mentioned first function is called.

In this embodiment, the process launch detecting unit 401 may be further configured to detect an operation corresponding to executing the above-mentioned process by a central processing unit of a host of the above-mentioned virtualization system. Specific implementation of the process launch detecting unit 401 can be referred to the detailed description of step 101 in the embodiment corresponding to FIG. 1, and will not be repeatedly described here.

In this embodiment, the executable instruction jumping subunit 4022 may include: a first function entry address acquiring module (not shown in the figure) for acquiring the entry address of the above-mentioned first function stored in the kernel space; and an executable instruction jumping module (not shown in the figure) for causing the executable instruction indicated by the above-mentioned signal to jump to the entry address of the above-mentioned first function.

In this embodiment, specific implementations of the signal detecting subunit 4021, the executable instruction jumping subunit 4022 and the signal processing capturing subunit 4023 can be referred to the detailed descriptions of steps 102, 103 and 104 in the embodiment corresponding to FIG. 1 respectively, and will not be repeatedly described here.

In some implementations of this embodiment, the apparatus for capturing the operation in this embodiment may further include: a system call capturing unit 403 for performing a step of capturing a system call operation, if the process launch detecting unit detects the process launch operation. The system call capturing unit 403 includes: a system call entry address acquiring subunit 4031 for reading, in kernel mode, a model specific register to acquire an entry address of a system call; an address replacing subunit 4032 for replacing, in user mode, an address of an entry function of the system call in the above-mentioned entry address with an address of a self-defined second function; and a system call capturing subunit 4033 for capturing the system call operation calling the second function, if the second function is called.

The system call entry address acquiring subunit 4031, the address replacing subunit 4032 and the system call capturing subunit 4033 can be referred to the detailed descriptions of steps 2031, 2032 and 2033 in the embodiment corresponding to FIG. 2 respectively, and will not be repeatedly described here.

Through the foregoing implementation, by means of the method for capturing the operation of this embodiment, a kernel access operation of a process in a container can be more comprehensively captured, and subsequently appropriate security measures can be taken for the captured operation, thereby more comprehensively ensuring the security of the container-based virtualization system.

In some implementations of this embodiment, the signal processing capturing unit 402 may further include: an address passing subunit (not shown in the figure) for passing, in user mode, the entry address of the above-mentioned first function to a kernel of a host in the above-mentioned virtualization system, and storing, in kernel mode, the entry address of the above-mentioned first function to a kernel space, prior to determining the presence of the unprocessed signal in the above-mentioned process.

According to the apparatus for capturing the operation in the container-based virtualization system provided in this embodiment, the executable instruction jumping subunit 4022 causes the executable instruction indicated by the unprocessed signal in the process to jump to the entry address of the self-defined first function, so that the signal processing operation that may access the kernel is captured, thereby implementing the capture of the access operation by the process in the container to the host kernel.

It should be appreciated by those skilled in the art that the foregoing apparatus 400 for capturing the operation further includes other well-known structures, for example, a processor and a memory. Such well-known structures are not shown in FIG. 4 so as to not unnecessarily obscure the embodiments of the disclosure.

Figure 5:
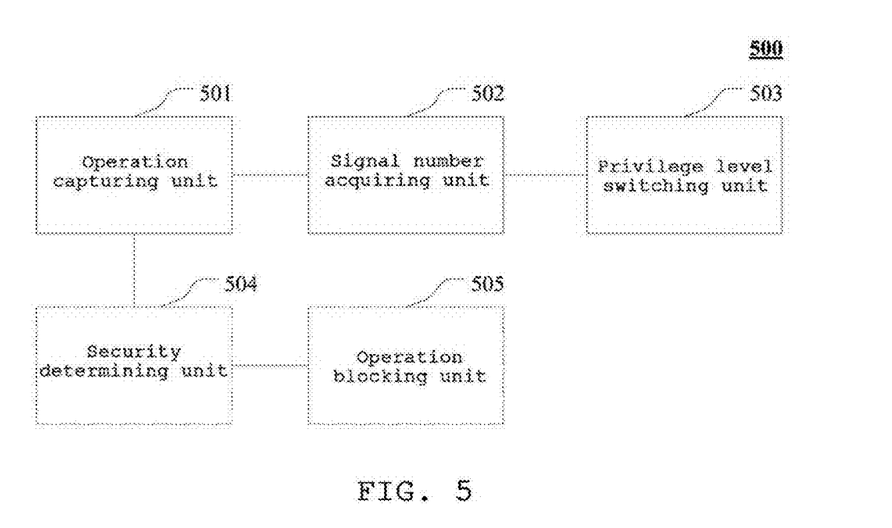
FIG. 5 is a schematic structural diagram of a security control apparatus for a container-based virtualization system according to one embodiment of the present application.

Next, referring to FIG. 5, as an implementation of the foregoing method as shown in FIG. 3, the present application provides one embodiment for a security control apparatus for a container-based virtualization system. This apparatus embodiment corresponds to the method embodiment shown in FIG. 3. The apparatus may be specifically applied to a container-based virtualization system.

As shown in FIG. 5, the security control apparatus 500 in this embodiment includes: an operation capturing unit 501, a signal number acquiring unit 502, and a privilege level switching unit 503. The operation capturing unit 501 is configured to capture a kernel access operation of a process in a container of the container-based virtualization system by using the apparatus provided in the embodiment corresponding to FIG. 4, the kernel access operation being a signal processing operation or a system call operation. The signal number acquiring unit 502 is configured to acquire a signal number corresponding to the above-mentioned signal processing operation, if the captured operation is the signal processing operation. The privilege level switching unit 503 is configured to switch an executable instruction indicated by a signal corresponding to the above-mentioned signal number to a privilege level Ring3 of a central processing unit for execution.

In this embodiment, the operation capturing unit 501, the signal number acquiring unit 502 and the privilege level switching unit 503 can be referred to the detailed descriptions of the steps 301, 302 and 303 in the embodiment corresponding to FIG. 3, and will not be repeatedly described here.

In some implementations of this embodiment, the security control apparatus in this embodiment may further include: a security determining unit 504 for, determining whether the above-mentioned system call operation is safe based on a system call number and an entry parameter that correspond to the captured system call operation, if the captured operation is the system call operation; and an operation blocking unit 505 for blocking the system call operation if the above-mentioned system call operation is determined to be unsafe.

The security determining unit 504 may be further configured to determine whether the system call operation is safe according to a preconfigured configuration file, the configuration file being used for specifying a system call number to be searched for and/or a resource to be protected, and an operation instruction associated with the system call number and/or the resource to be protected. Specific implementations of the security determining unit 504 and the operation blocking unit 505 and the technical effects achieved thereby can be referred to the detailed descriptions of related implementations in the embodiment corresponding to FIG. 3, and will not be repeatedly described here.

According to the security control apparatus for the container-based virtualization system provided in this embodiment, the privilege level switching unit 503 switches the executable instruction indicated by the signal corresponding to the captured signal processing operation to the privilege level Ring3 of the central processing unit for execution, so that the above-mentioned executable instruction runs in security mode, thereby blocking the execution of risky instructions and enhancing the security of the container-based virtualization system.

It should be appreciated by those skilled in the art that the foregoing security control apparatus 500 further includes other well-known structures, for example, a processor and a memory. Such well-known structures are not shown in FIG. 5 so as to not unnecessarily obscure the embodiments of the disclosure.

Hereinafter, referring to FIG. 6, a schematic structural diagram of a computer system 600 adapted to implement a container-based virtualization system according to an embodiment of the present application is shown.

Figure 6:
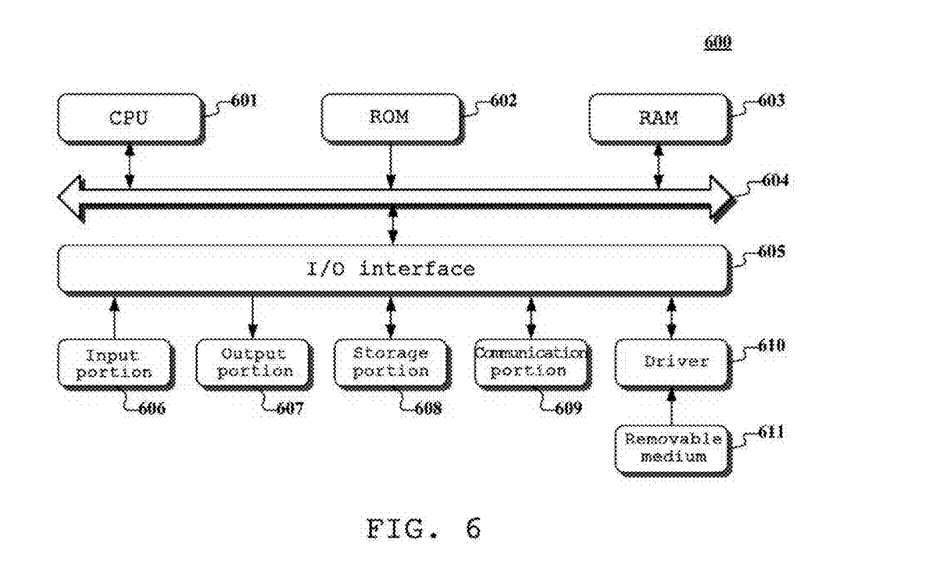
FIG. 6 is a schematic structural diagram of a computer system adapted to implement a physical machine where a container-based virtualization system according to an embodiment of the present application is located.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method of the flow chart. In such an embodiment, the computer program may be downloaded and installed from a network via the communication portion 609, and/or may be installed from the removable media 611.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a process launch detecting unit and a signal processing capturing unit, where the names of these units are not considered as a limitation to the units. For example, the signal processing capturing unit may also be described as "a unit for capturing signal processing."

In another aspect, the present application further provides a computer readable storage medium. The computer readable storage medium may be the computer readable storage medium included in the apparatus in the above-mentioned embodiments, or a stand-alone computer readable storage medium which has not been assembled into the apparatus. The above-mentioned computer readable storage medium stores one or more programs. The above-mentioned one or more programs cause a device to, when being executed by the above-mentioned device: detect, in a user mode, a process launch operation in a container of the container-based virtualization system; and perform, in a kernel mode, a step of capturing a signal processing operation, if the above-mentioned process launch operation is detected, the step of capturing the signal processing operation comprising: determining a presence of an unprocessed signal in the above-mentioned process; causing an executable instruction indicated by the above-mentioned signal to jump to an entry address of a self-defined first function, and passing a signal number of the unprocessed signal to the above-mentioned first function, if the above-mentioned signal exists; and capturing a signal processing operation corresponding to the passed signal number, if the above-mentioned first function is called.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A capturing system for capturing an operation in a container-based virtualization system, the capturing system comprising:
   a non-transitory memory that stores at least one of instructions or data; and
   a processor communicatively coupled to the non-transitory memory, in operation, the processor performs actions including:
      detecting, in a user mode, a process launch operation in a container of the container-based virtualization system; and
      performing, in a kernel mode, a step of capturing a signal processing operation, if the process launch operation is detected,
      the step of capturing the signal processing operation comprising:
         determining a presence of an unprocessed signal in a process associated with the process launch operation;
         causing an executable instruction indicated by the unprocessed signal to jump to an entry address of a self-defined first function, and passing a signal number of the unprocessed signal to the first function, if the unprocessed signal exists; and
         capturing a signal processing operation corresponding to the passed signal number, if the first function is called.

2. The capturing system according to claim 1, the actions further comprising: performing a step of capturing a system call operation, if the process launch operation is detected,
   wherein the step of capturing the system call operation comprises:
      reading, in the kernel mode, a model specific register to acquire an entry address of a system call;
      replacing, in the user mode, an address of an entry function of the system call in the entry address of the system call with an address of a self-defined second function; and
      capturing a system call operation calling the second function, if the second function is called.

3. The capturing system according to claim 1, wherein the action of detecting the process launch operation in the container of the container-based virtualization system comprises:
   detecting an operation corresponding to executing the process by a central processing unit of a host of the virtualization system.

4. The capturing system according to claim 1, wherein the action of capturing the signal processing operation further comprises:
   passing, in the user mode, the entry address of the first function to a kernel of a host in the virtualization system, and storing, in the kernel mode, the entry address of the first function in a kernel space, prior to the determining the presence of the unprocessed signal in the process.

5. The capturing system according to claim 4, wherein the action of causing the executable instruction indicated by the unprocessed signal to jump to the entry address of the self-defined first function comprises:
   acquiring the entry address of the first function stored in the kernel space; and
   causing the executable instruction indicated by the unprocessed signal to jump to the entry address of the first function.

6. A security control system for a container-based virtualization system, the security control system comprising:
   a non-transitory memory that stores at least one of instructions or data; and
   a processor communicatively coupled to the non-transitory memory, in operation, the processor performs actions including:
      capturing a kernel access operation of a process in a container of the container-based virtualization system by using a method for capturing an operation in the container-based virtualization system, the kernel access operation being a signal processing operation or a system call operation and the method for capturing the operation in the container-based virtualization system comprising:
         detecting, in a user mode, a process launch operation in a container of the container-based virtualization system; and
         performing, in a kernel mode, a step of capturing a signal processing operation, if the process launch operation is detected,
         the step of capturing the signal processing operation comprising:
            determining a presence of an unprocessed signal in a process associated with the process launch operation;
            causing an executable instruction indicated by the unprocessed signal to jump to an entry address of a self-defined first function, and passing a signal number of the unprocessed signal to the first function, if the unprocessed signal exists; and capturing a signal processing operation corresponding to the passed signal number, if the first function is called;

acquiring a signal number corresponding to the signal processing operation, if the captured kernel access operation is the signal processing operation; and switching an executable instruction indicated by a signal corresponding to the signal number to a privilege level Ring3 of a central processing unit for execution.

7. The security control system according to claim 6, the actions further comprising:

determining whether the system call operation is safe based on a system call number and an entry parameter corresponding to the captured system call operation, if the captured kernel access operation is the system call operation; and blocking the system call operation if the system call operation is determined to be unsafe.

8. The security control system according to claim 7, wherein the action of determining whether the system call operation is safe based on the system call number and the entry parameter corresponding to the captured system call operation comprises:

determining whether the system call operation is safe according to a preconfigured configuration file, the configuration file being used for specifying a system call number to be searched for and/or a resource to be protected, and an operation instruction associated with the system call number and/or the resource to be protected.

9. An apparatus for capturing an operation in a container-based virtualization system, comprising:

a process launch detecting unit for detecting, in a user mode, a process launch operation in a container of the container-based virtualization system; and a signal processing capturing unit for performing, in a kernel mode, a step of capturing a signal processing operation, if the process launch detecting unit detects the process launch operation, the signal processing capturing unit comprising:

a signal detecting subunit for determining a presence of an unprocessed signal in a process associated with the process launch operation;

an executable instruction jumping subunit for causing an executable instruction indicated by the unprocessed signal to jump to an entry address of a self-defined first function, and passing a signal number of the unprocessed signal to the first function, if the unprocessed signal exists; and a signal processing capturing subunit for capturing a signal processing operation corresponding to the passed signal number, if the first function is called.

10. The apparatus according to claim 9, further comprising: a system call capturing unit for performing a step of capturing a system call operation, if the process launch detecting unit detects the process launch operation, the system call capturing unit comprising:

a system call entry address acquiring subunit for reading, in the kernel mode, a model specific register to acquire an entry address of a system call;

an address replacing subunit for replacing, in the user mode, an address of an entry function of the system call in the entry address of the system call with an address of a self-defined second function; and a system call capturing subunit for capturing the system call operation calling the second function, if the second function is called.

11. The apparatus according to claim 9, wherein the process launch detecting unit is further configured to detect an operation corresponding to executing the process by a central processing unit of a host of the virtualization system.

12. The apparatus according to claim 9, wherein the signal processing capturing unit further comprises:

an address passing subunit for passing, in the user mode, the entry address of the first function to a kernel of a host in the virtualization system, and storing, in the kernel mode, the entry address of the first function in a kernel space, prior to determining the presence of the unprocessed signal in the process.

13. The apparatus according to claim 12, wherein the executable instruction jumping subunit comprises:

a first function entry address acquiring module for acquiring the entry address of the first function stored in the kernel space; and an executable instruction jumping module for causing the executable instruction indicated by the unprocessed signal to jump to the entry address of the first function.

14. A security control apparatus for a container-based virtualization system, comprising:

an operation capturing unit for capturing a kernel access operation of a process in a container of the container-based virtualization system by using an apparatus for capturing an operation in the container-based virtualization system, the kernel access operation being a signal processing operation or a system call operation and the apparatus for capturing the operation in the container-based virtualization system comprising:

a process launch detecting unit for detecting, in a user mode, a process launch operation in a container of the container-based virtualization system; and a signal processing capturing unit for performing, in a kernel mode, a step of capturing a signal processing operation, if the process launch detecting unit detects the process launch operation, the signal processing capturing unit comprising:

a signal detecting subunit for determining a presence of an unprocessed signal in a process associated with the process launch operation;

an executable instruction jumping subunit for causing an executable instruction indicated by the unprocessed signal to jump to an entry address of a self-defined first function, and passing a signal number of the unprocessed signal to the first function, if the unprocessed signal exists; and a signal processing capturing subunit for capturing a signal processing operation corresponding to the passed signal number, if the first function is called;

a signal number acquiring unit for acquiring a signal number corresponding to the signal processing operation, if the captured kernel access operation is the signal processing operation; and a privilege level switching unit for switching an executable instruction indicated by a signal corresponding to the signal number to a privilege level Ring3 of a central processing unit for execution.

15. The security control apparatus according to claim 14, further comprising:

a security determining unit for determining whether the system call operation is safe based on a system call number and an entry parameter corresponding to the captured system call operation, if the captured kernel access operation is the system call operation; and an operation blocking unit for blocking the system call operation if the system call operation is determined to be unsafe.

16. The security control apparatus according to claim 15, wherein the security determining unit is further configured to determine whether the system call operation is safe according to a preconfigured configuration file, the configuration file being used for specifying a system call number to be searched for and/or a resource to be protected, and an operation instruction associated with the system call number and/or the resource to be protected.

* * * * *